United States Patent [19]

Shiraishi et al.

[11] Patent Number: 4,860,847
[45] Date of Patent: Aug. 29, 1989

[54] VEHICLE TRACTION CONTROL DEVICE

[75] Inventors: Shuji Shiraishi; Masakazu Sakaguchi; Takashi Nishihara, all of Wako, Japan

[73] Assignee: Honda Giken Kogyo Kabushiki Kaisha, Tokyo, Japan

[21] Appl. No.: 181,954

[22] Filed: Apr. 15, 1988

[30] Foreign Application Priority Data

Apr. 17, 1987 [JP] Japan .................. 62-94392
Apr. 17, 1987 [JP] Japan .................. 62-94393

[51] Int. Cl.$^4$ .................................. B62D 28/16
[52] U.S. Cl. ........................ 180/197; 123/481; 364/426.02
[58] Field of Search ........... 180/197, 167, 169; 123/352, 332, 333, 481; 364/426, 424

[56] References Cited

U.S. PATENT DOCUMENTS

| | | | |
|---|---|---|---|
| 3,938,611 | 2/1976 | Bertolasi | 180/197 |
| 4,432,430 | 2/1984 | Lind | 180/197 |
| 4,589,511 | 5/1986 | Leiber | 180/197 |
| 4,600,215 | 7/1986 | Kuroki | 180/169 |
| 4,697,091 | 9/1987 | Tamura | 364/426 |
| 4,712,634 | 12/1987 | Lindemann | 180/197 |

FOREIGN PATENT DOCUMENTS

| | | | |
|---|---|---|---|
| 64669 | 11/1982 | European Pat. Off. | 180/197 |
| 151160 | 8/1985 | Japan | 180/197 |
| 2158270 | 11/1985 | United Kingdom | 180/197 |

*Primary Examiner*—Mitchell J. Hill
*Attorney, Agent, or Firm*—Armstrong, Nikaido Marmelstein, Kubovcik & Murray

[57] ABSTRACT

A vehicle traction control device includes an engine output controller for deactivating the combustion stroke of an engine in order to control the vehicle traction, a vehicle speed judgment circuit for judging whether or not a speed detected by a vehicle speed detector is lower than a preset speed, and an engine revolution-number judgment circuit for judging whether or not a value detected by an engine revolution-number detector exceeds a preset value, wherein the vehicle speed judgment circuit and the engine revolution-number judgment circuit are connected to the engine output controller so as to deactivate the engine combustion stroke when the vehicle speed is lower than the preset speed and the number of revolution of the engine exceeds the preset value. The vehicle traction control device further includes an excessive slip detector for detecting an excessive slip in a driving wheel which is driven by the engine, a vehicle speed index output circuit for outputting an index representative of the vehicle speed, and a combustion stroke deactivating period setting circuit for reducing the rate of a period of deactivating the engine combusion stroke per revolution of the engine, caused by the engine output controller, in accordance with the index, wherein the engine output controller operates also in response to detection of an excessive slip by the excessive slip detector. Thereby excessive slip in the vehicle driving wheels is controlled so that the traction for the vehicle is prevented from deteriorating.

3 Claims, 7 Drawing Sheets

VEHICLE TRACTION CONTROL DEVICE

BACKGROUND OF THE INVENTION

1. Field of the Invention

The present invention relates to a vehicle traction control device which is capable of preventing lowering of the traction or driving force available for the vehicle while controlling excessive slip in traction wheels or driving wheels of the vehicle, particularly at a low vehicle speed range.

2. Description of the Prior Art

In order to reduce the traction for the controlling of excessive slip in the traction or driving wheels, it has been known to make the combustion stroke of an engine ineffective, as shown, for example, in U.S. Pat. Nos. 4,432,430 and 4,589,511. In this case, low-select control is employed at a low vehicle speed range so as not to spoil the traction obtainable from reaction of a differential device. In said low-select control spinning of one of the traction wheels is permitted and when the other traction wheel also spins or slips excessively, the combustion stroke of engine is made ineffective.

In the above conventional measure, due to the fact that low-select control is carried out during low speed travel of the vehicle and an arrangement is required to prevent an engine stalling when its combustion stroke is made ineffective, the speed of that traction wheel which rotates faster than the other rises to an extremely high level in case of the traction control at a low vehicle speed. This may lead to a problem that the accelerating feeling is deteriorated and the traction is lowered.

Furthermore, if the engine has a plurality of cylinders, it may be considered that fuel supply to respective cylinders is cut in order to deactivate their combustion stroke. In this case, however, when the vehicle travels at a low speed and accordingly it takes a long time for the engine to perform one combustion cycle, the cycle of making fuel supply and cut of such fuel supply is prolonged thereby to cause judder of a suspension system. This undesirably results in lowering of the drivability.

SUMMARY OF THE INVENTION

The present invention has been proposed in view of the above and aims at providing a vehicle traction control system which could overcome the afore-mentioned problems pertaining to conventional devices.

In order to achieve the above object, according to the invention, there is proposed a vehicle traction control device comprising an engine output controller for deactivating a combustion stroke of an engine in order to control a traction of a vehicle, a vehicle speed judgment means for judging whether a speed detected by a vehicle speed detecting means, which is adapted to detect a vehicle speed, is lower than a preset speed, and an engine revolution-number judgment means for judging whether a value detected by an engine revolution-number detector, which is adapted to detect the number of revolution of the engine, exceeds a preset value, wherein said vehicle speed judgment means and said engine revolution-number judgment means are connected to said engine output controller so as to deactivate the combustion stroke of the engine when the vehicle speed is lower than said preset speed and the number of revolution of the engine exceeds said preset value.

Further according to the invention, there is proposed a vehicle traction control device comprising an excessive slip detecting means for detecting an excessive slip in a driving wheel which is driven by an engine, an engine output controller for deactivating a combustion stroke of the engine in response to detection of the excessive slip by said detecting means, a vehicle speed index output means for outputting an index representative of a vehicle speed, and a combustion stroke deactivating means for reducing a rate of a period of deactivating the combustion stroke of the engine per revolution of the engine, caused by said engine output controller, in accordance with said index.

With the above arrangement, when a vehicle speed is lower than a predetermined level, the combustion stroke of an engine is deactivated in response to rise in the number of revolution of the engine above a given level. Therefore, the speed of one driving wheel is prevented from becoming extremely high and reduction of the traction is avoided.

Moreover, due to the above arrangement, since there is provided a combustion stroke deactivating means for reducing the rate of a period of deactivating the combustion stroke of the engine per revolution of the engine, caused by the engine output controller, in accordance with an index from the vehicle speed index output means, the period of deactivating the combustion stroke can be shortened in response to, for example, a decrease in the vehicle speed and the cycle of making fuel supply and cut of fuel supply can be made short at the time of low speed travel, which prevents deterioration of the drivability while avoiding lowering of the driving force.

In the above arrangement, if a device for detecting a bad road surface is provided and the engine output controller is constructed so as to deactivate the engine combustion stroke in response to a signal from the combustion stroke deactivating period setting means when the vehicle exhibits an excessive slip and the road condition is detected to be bad, then the similar control procedure can be performed as in case of the afore-mentioned arrangement also upon detection of a bad road condition. This serves to prevent deterioration of the drivability and lowering of the driving force when the vehicle is travelling on a bad road.

BRIEF DESCRIPTION OF THE DRAWINGS

The above and other objects, features and advantages of the invention will become apparent from reading the following description of the preferred embodiments, taken in conjunction with the accompanying drawings, wherein.

DESCRIPTION OF THE PREFERRED EMBODIMENTS

Embodiments of the present invention when employed in a vehicle equipped with a six-cylinder engine will now be described with reference to the accompanying drawings.

Figure 1:
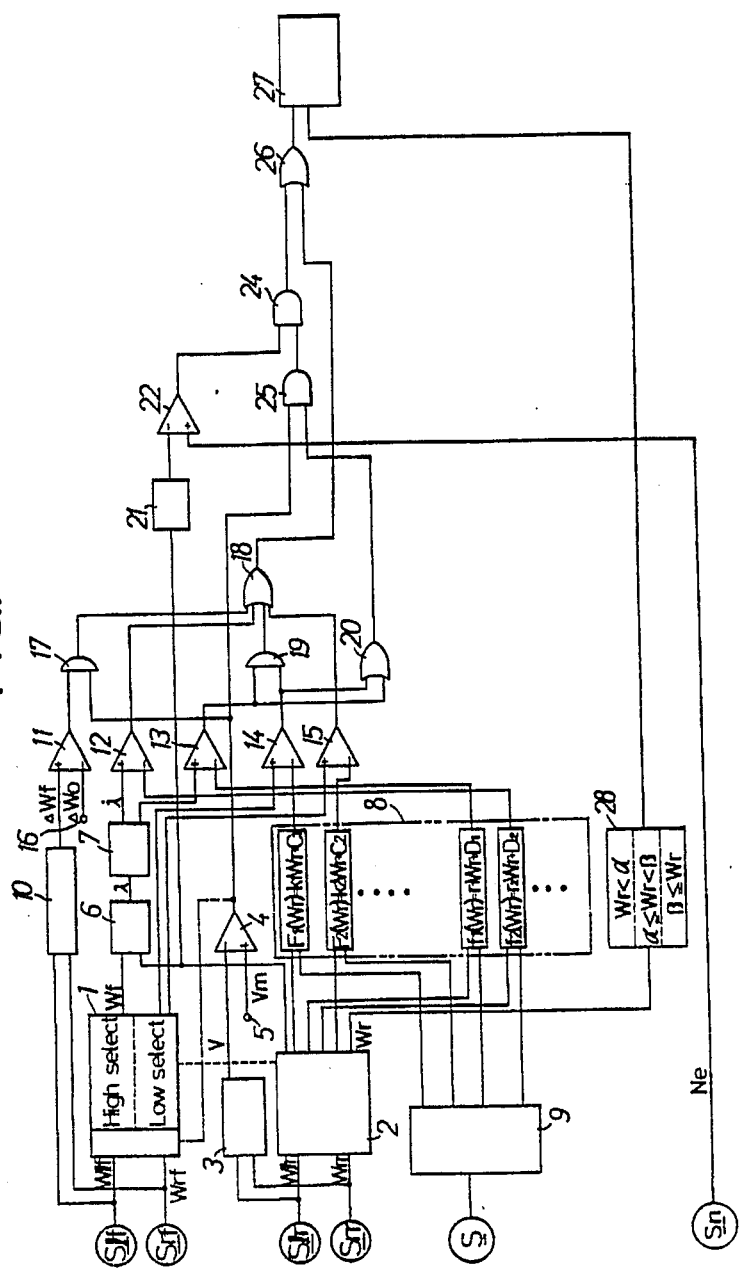
FIG. 1 is a block diagram of a first embodiment of the instant invention, which is employed in a vehicle equipped with a six-cylinder engine.

FIGS. 1 to 4 illustrate a first embodiment. Referring first to FIG. 1, the speeds Wlf and Wrf of left and right driving wheels in a vehicle, e.g., left and right front wheels in a front wheel drive vehicle, are detected by a left front wheel speed detector Slf and a right front wheel speed detector Srf, respectively. The speeds Wlr and Wrr of left and right trailing wheels, e.g., left and right rear wheels, are also detected by a left rear wheel speed detector Slr and a right rear wheel speed detector Srr, respectively.

The left and right front wheel speeds Wlf and Wrf, detected by the left and right front wheel speed detectors Slf and Srf, are delivered to a change-over selecting circuit 1 which is changed over between a high-selection mode which selects a higher one of the left and right wheel speeds Wlf and Wrf as a front wheel speed Wf, and a low-selection mode which selects a lower one of the left and right wheel speeds Wlf and Wrf as a front wheel speed Wf, depending upon the vehicle speed calculated in vehicle speed arithmetic circuits. If the vehicle speed is at an extremely low level, for example, lower than 4 km/hr, the change-over selecting circuit 1 changes to the low-selection mode.

On the other hand, the left and right rear wheel speeds Wlr and Wrr detected by the left and right rear wheel speed detectors Slr and Srr are input to a selecting circuit 2 which functions as a vehicle speed index output means for outputting an index representing the vehicle speed to the cylinder-number determination circuit 28 as well as to the reference value determination circuit 8 which is operated in response to the selecting operation of the selecting circuit 1. Thus, the speed of the rear wheel on the same side as selected by the change-over selecting circuit 1 is selected by the selecting circuit 2. For example, when the left front wheel speed Wlf is selected as the front wheel speed Wf in the change-over selecting circuit 1, the left rear wheel speed Wlr is selected as the rear wheel speed Wr in the selecting circuit 2. This is for the purpose of eliminating a difference in length between left and right travel paths in a turn.

Values detected by the left and right rear wheel speed detectors Slr and Srr are also applied to a vehicle speed arithmetic circuit 3 as a vehicle speed detecting means where the vehicle speed is calculated according to the following equation:

$$V = \frac{Wlr + Wrr}{2} \quad (1)$$

That is, an average value between the left and right rear wheel speeds Wlr and Wrr is delivered as a vehicle speed V from the vehicle speed arithmetic circuit 3, and such an output signal is supplied to an inverted input terminal of a comparator 4 as a vehicle speed judgment means. A reference signal corresponding to an extremely slow speed value Vm, e.g., 4 km/hr, is supplied from a reference terminal 5 to a non-inverted input terminal of the comparator 4, and if the vehicle speed V is for example, at an extremely low speed lower than 4 km/hr, then a high level signal is produced from the comparator 4 and supplied to the change-over selecting circuit 1. Therefore, when the output from the comparator 4 assumes the high level, the change-over selecting circuit 1 changes to the low-selection mode.

The front wheel speed Wf selected in the change-over selecting circuit 1 and the rear wheel speed Wr selected in the selecting circuit 2 are applied to a slip rate arithmetic circuit 6 where the slip rate $\lambda$ is calculated according to the following equation:

$$\lambda = \frac{Wf - Wr}{Wf} \quad (2)$$

The slip rate $\lambda$ calculated in the slip rate arithmetic circuit 6 is applied to a differentiating circuit 7 where a differential value $\dot{\lambda}$ (where $\dot{\lambda} = d\lambda/dt$) of the slip rate $\lambda$ is calculated.

For a characteristic value indicative of the slipped state of either the left or right driving wheel, i.e., front wheel, reference values respectively corresponding to the slip rate $\lambda$ and the differential slip rate $\dot{\lambda}$ are set in a reference value determination circuit 8 in the form of a function of the rear wheel speed Wr representative of the vehicle speed. Moreover, a set of these reference values are prepared for each road condition of a different coefficient of friction, for example, a flat road and a bumpy road (bad road).

More specifically, for the reference values corresponding to the slip rate $\lambda$, $F_1(Wr) = k_1 Wr + C_1$ and $F_2(Wr) = k_2 Wr + C_2$ are prepared for one of the road conditions. In addition, for the reference values corresponding to the differential slip rate $\dot{\lambda}$, $f_1(Wr) = r_1 Wr + D_1$ and $f_2(Wr) = r_2 Wr + D_2$ are prepared in correspondence to one road condition, wherein $k_1$, $k_2$, $C_1$, $C_2$, $r_1$, $r_2$, $D_1$ and $D_2$ are constants for determining the reference values $F_1(Wr)$, $F_2(Wr)$, $f_1(Wr)$ and $f_2(Wr)$ and prepared for each different road condition. These constants (generated in constant reference value change-over means 9) and the rear wheel speed Wr selected in the selecting circuit 2 are applied to the reference value determination circuit 8.

It should be noted that the reference values $F_1(Wr)$ and $f_1(Wr)$, having the subscript 1, are set for a preliminary control and at levels smaller than the reference values $F_2(Wr)$ and $f_2(wr)$, having the subscript 2, and all the references for bumpy (bad) roads are set at a larger levels than the reference values for a flat road.

The vehicle is equipped with a road condition sensor S which senses the condition of a road surface in a composite manner by using, for example, the rate of reflection of light or ultrasonic wave and the surrounding temperature. Corresponding to the road condition sensed by the sensor S, the constant reference value change-over means 9 is operated and the reference value determination circuit 8 outputs the reference values $F_1(Wr)$, $F_2(Wr)$, $f_1(Wr)$ and $f_2(Wr)$ in accordance with the road condition.

The values detected in the left and right front wheel speed detectors Slf and Srf are applied to a subtraction circuit 10 which provides an absolute value $|Wrf - Wrf| = |\Delta Wf|$ of a difference between both the front wheel speeds Wlf and Wrf. The subtraction circuit 10 is connected to a non-inverted input terminal of a comparator 11. A signal corresponding to a difference $\Delta W_o$ between reference wheel speeds is input from a reference terminal 16 to an inverted input terminal of the comparator 11. This permits the comparator 11 to generate a high level signal when the absolute value

|ΔWf| of the difference between front wheel speeds exceeds the difference ΔW$_o$ between reference wheel speeds. In other words, when it is decided that one of the front wheels is excessively slippinfg and racing, the comparator 11 produces the high level signal.

The differential slip rate λ̇ calculated in the differentiating circuit 7 is applied to non-inverted input terminals of comparators 12 and 13. The reference value f$_2$ (Wr) corresponding to the differential slip rate λ̇ is supplied fron the reference value determination circuit 8 to an inverted input terminal of the comparator 12, while the reference value f$_1$ (Wr) is supplied to an inverted input terminal of the comparator 13. On the other hand, the front wheel speed Wf selected in the change-over selecting circuit 1 is input to non-inverted input terminals of comparators 14 and 15. Further, the reference value F$_1$ (Wr) corresponding to the slip rate λ is fed from the reference value determination circuit 8 to an inverted input terminal of the comparator 14, while the reference value F$_2$ (Wr) is fed to an inverted input terminal of the comparator 15.

The comparator 12 decides whether or not the differential slip rate λ̇ is too large. The comparator 15 decides whether or not the slip rate λ is too large. The comparators 13 and 14 also decide whether or not the differential slip rate λ̇ and the slip rate λ are too large. If these values are too large, then the comparators 13 and 14 produce high level outputs.

An output from the comparator 11 is applied to an input terminal of AND gate 17, while an output from the comparator 4 is applied to the other input terminal of the AND gate 17. More specifically, when the vehicle speed is extremely low and one of the front wheels is racing or spinning, the output from the AND gate 17 assumes a high level. The AND gate 17 is connected to OR gate 18.

In addition to the AND gate 17, outputs from the comparator 12, an AND gate 19 and the comparator 15 are applied to the OR gate 18. Outputs from the comparators 13 and 14 are applied to two input terminals of AND gate 19. Thus, an output from the OR gate 18 assumes a high level, when at least any one of the following cases is established: when the output from the AND gate 17 assumes a high level, that is, the vehicle speed is extremely low and one of the front wheels is racing; when the differential slip rate λ̇ is too large; when the slip rate λ is too large; and when the output from AND gate 19 assumes a high level, that is, it is decided for preliminary control purposes that the wheel is about to begin slipping excessively.

The OR gate 18 is connected to one of the input terminals of an OR gate 26. The output terminals of the comparators 13 and 14 are connected respectively to input terminals of an OR gate 20 which is connected to one of the input terminals of an AND gate 25. Further, the output from the comparator 4 is input to the other input terminal of AND gate 25. Thus, an output from the AND gate 25 assumes a high level when the vehicle speed is extremely low and either the slip rate λ or the differential slip rate λ̇ meets a deciding condition for deciding that the wheel is about to begin slipping excessively. The output of AND gate 25 is connected to one of the input terminals of AND gate 24.

The reference value determination circuit 8, constant reference value change-over means 9, comparators 12, 13, 14 and 15, OR gates 18 and 20 and AND gate 19 constitute an excessive slip detecting means according to an example of the invention.

Figure 2:
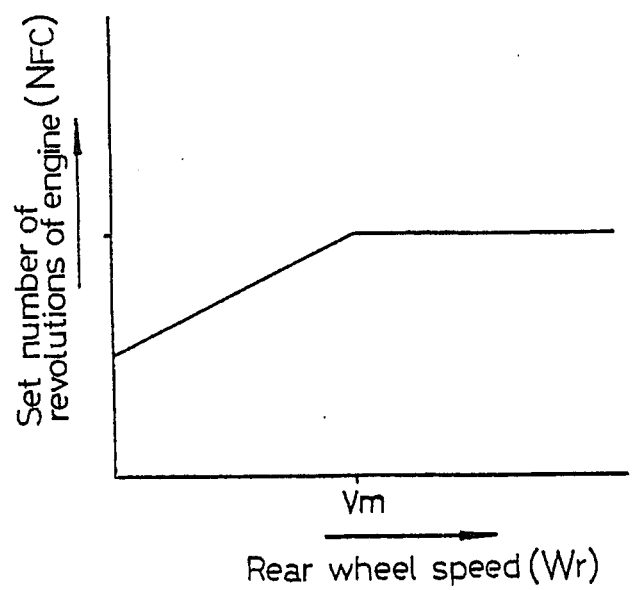
FIG. 2 is a graph illustrating the set number of revolutions of the engine.

An output of a comparator 22 as an engine revolution-number judgment means is input to the other input terminal of AND gate 24, and an inverted input terminal of the comparator 22 is connected to an output terminal of an engine revolution-number setting circuit 21. The number of revolutions of engine relative to the rear wheel speed Wr, representative of the vehicle speed, is set in the engine revolution-number setting circuit 21, as shown in FIG. 2, and the rear wheel speed Wr selected in the selecting circuit 2 is applied to the engine revolution-number setting circuit 21. That is, the engine revolution-number setting circuit 21 produces a signal indicative of the set number N$_{FC}$ of revolutions of engine in accordance with the rear wheel speed Wr input thereto and applies it to the inverted input terminal of the comparator 22. Further, the value detected by engine revolution-number detector Sn is applied to a non-inverted input terminal of the comparator 22. Thus, the comparator 22 feeds a high level signal into AND gate 24 when the actual number Ne of revolutions of engine detected in the engine revolution-number detector Sn has exceeded the number N$_{FC}$ of revolutions of engine set in the engine revolution-number setting circuit 21. That is, the AND gate 24 produces a high level signal, as the number of revolutions of engine exceeds a set value when the vehicle speed is at an extremely low level and the front wheel is about to begin to slip excessively.

The output from AND gate 24 is applied to the other input terminal of the OR gate 26. The output from the OR gate 18 has been applied to the one input terminal of OR gate 26, as described above, and therefore, an output from the OR gate 26 assumes a high level, in response to the establishment of at least one of the following cases: when the driving or front wheel has slipped excessively; when the driving wheel is about to excessively slip; and when the number of revolutions of engine has exceeded the set value when the vehicle speed is extremely low and the driving wheel is about to slip excessively.

The output from the OR gate 26 is input to an engine output controller 27 which deactivates the combustion stroke of an engine to control the driving force or traction available for the vehicle, thereby preventing an excessive slippage of the driving wheel. When the output from the OR gate 26 has assumed the high level, the engine output controller 27 deactivates the combustion stroke of the engine. Moreover, the engine output controller 27 cuts off the supply of fuel to cylinders of the number set in a cylinder-number determination circuit 28 as a combustion stroke deactivating means, according to the rear wheel speed Wr representative of the vehicle speed.

The rear wheel speed Wr is fed from the selecting circuit 2 to the cylinder-number determination circuit 28. The numerals indicative of the numbers of cylinders are set in the cylinder-number determination circuit 28, for example, the number 3 when the rear wheel speed Wr is less than a set value α, e.g., 12 km/hr (Wr<α), for example, the numeral 4 when the rear wheel speed Wr is more than the set value α and less than a set value β, e.g., 20 km/hr (α≦Wr<β), and for example, the number 6 when the rear wheel speed Wr is more than the set value (β≦Wr). A signal corresponding to each of the numbers of cylinders is applied to the engine output controller 27. That is, as the vehicle speed represented by the rear wheel speed Wr is reduced, the number of cylinders whose combustion stroke is deactivated is reduced.

Figure 3:
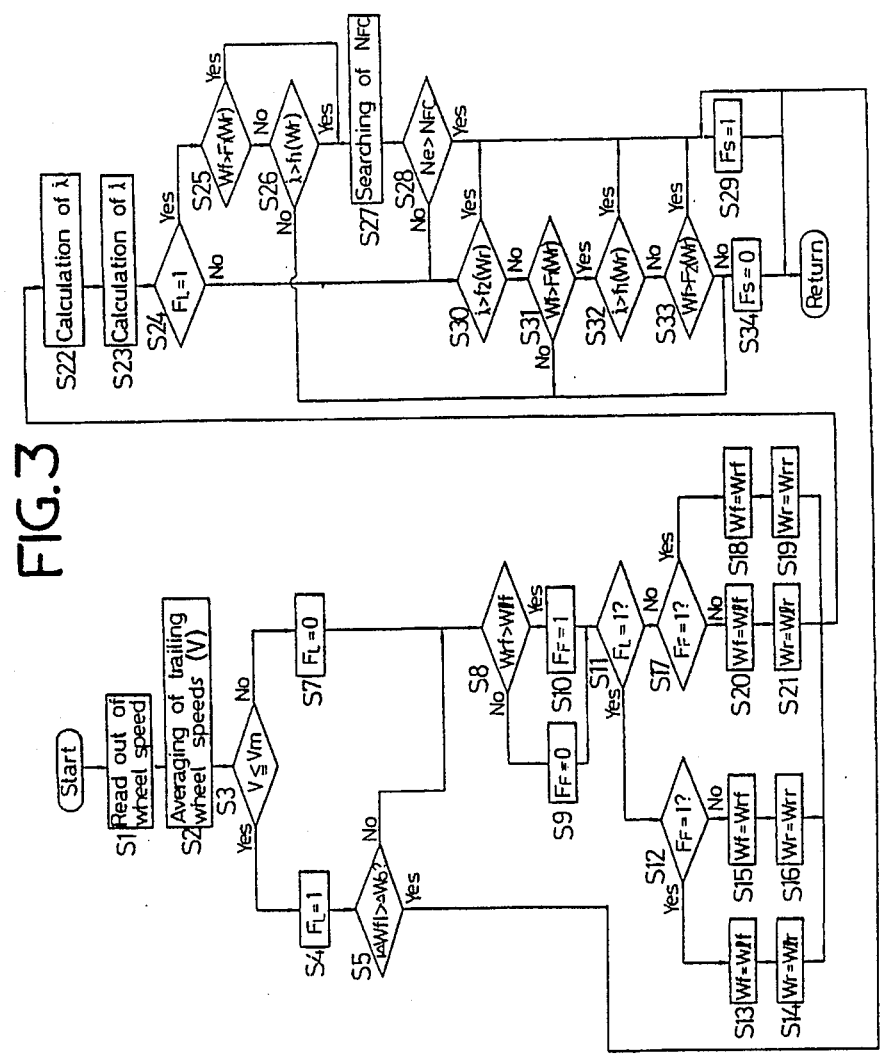
FIGS. 3 and 4 are flow charts each illustrating a controlling procedure during the movement of the vehicle.

The operation of this embodiment will be described below. Referring to FIG. 3 illustrating a control procedure, the individual wheel speeds Wlf, Wrf, Wlr, and Wrr are read in a first step S1, and the trailing wheel speeds Wlr and Wrr are averaged to provide a vehicle speed V in second step S2. Then, it is decided in a third step S3 whether or not the vehicle speed V is lower than the set value Vm, i.e., whether or not the vehicle speed V is at an extremely low level. When it is decided in the third step S3 that the vehicle speed V is at the extremely low level, a flat $F_L$ becomes "1" in a fourth step S4, progressing to a fifth step S5.

In the fifth step S5, it is decided whether or not the absolute value $|\Delta Wf|$, of a difference between the driving wheel speeds, exceeds the set value $\Delta W_o$. That is, it is decided whether or not either one of the front wheels is racing, and when it is decided that such one wheel is not racing, i.e., $|\Delta Wf| \leq \Delta W_o$, progress is made to an eighth step S8. Also, when the vehicle speed V is decided not to be at the extremely low level, the flag $F_L$ becomes "0" in a seventh step S7, progressing to the eighth step S8. Further, when it is decided that the one driving wheel is racing, progress is made to a 29th step S29.

At the eighth step S8, it is decided whether or not the right front wheel speed Wrf is larger than the left front wheel speed Wlf. That is, the magnitudes of the both front wheel speeds are compared at the eighth step S8, because one of the front wheel speeds is selected as a front wheel speed in the change-over selecting circuit 1 depending upon either the high selection mode or the low selection mode. When Wrf$\leq$Wlf is decided in the eighth step S8, a flag $F_F$ becomes "0", followed by an 11th step S11. When Wrf>Wlf is decided in the eighth step S8, the flag $F_F$ is changed to "1" at a 10th step S10, followed by the 11th step S11.

In the 11th step S11, it is decided whether or not the vehicle speed is extremely low, i.e., $F_L=1$. When $F_L=1$, i.e., when the vehicle speed is extremely low, it is decided in a 12th step S12 whether or not the right front wheel speed Wrf is larger than the left front wheel speed Wlf, i.e., whether or not $F_F$ is "1". When $F_F=1$, Wf=Wlf is established in a 13th step S13 and then, Wr=Wlr is established in a 14th step S14, progressing to a 22nd step S22. On the other hand, when $F_F=0$ at the 12th step S12, Wf=Wrf is established in the 15th step S15 and then, Wr=Wrr at 16th step S16, progressing to a 22nd step S22.

When $F_L=0$ in the 11th step S11, i.e., when the vehicle speed is not at the extremely low level, it is judged in a 17th step S17 whether or not $F_F$ is "1". When $F_F=1$, a step is taken from the 17th step S17 successively to 18th and 19th steps S18 and S19 where Wf=Wrf and Wr=Wrr are established, proceeding to the 22nd step S22. Alternatively, when $F_F=0$ at the 17th step S17, a step is taken to 20th step and 21st step S20 and S21 is succession, where Wf=Wlf and Wr=Wlr are established, proceeding to the 22nd step S22.

In the 22nd step S22, the slip rate $\lambda$ is calculated and then, in a 23rd step S23, the differential slip rate $\lambda$ is calculated. At a 24th step S24, it is judged whether or not the vehicle speed is extremely low, i.e., whether or not $F_L=1$. When $F_L=1$, i.e., when the vehicle speed is extremely low, a step is taken to a 25th step S25, whereas when $F_L=0$, i.e., when the vehicle speed is not extremely low, a step is taken to a 30th step S30. In the 25th step S25, it is judged whether or not Wf>$F_1$(Wr). When Wf>$F_1$(Wr), a step is taken to a 27th step S27, wherein when Wf$\leq F_1$(Wr), a step is taken to a 26th step S26. In step S26, it is decided whether or not $\lambda$>$f_1$(Wr). When $\lambda$>$f_1$(Wr), a step is taken to a 27th step S27, on the one hand, and when $\lambda\leq f_1$(Wr), a step is taken to a 34th step S34, on the other hand. In step S27, the set number $N_{FC}$ of revolutions of engine according to the rear wheel speed Wr is searched from a table shown in FIG. 2, and in step S28, the searched set number $N_{FC}$ of revolutions of engine is compared with the actual number Ne of revolutions of engine. If Ne>$N_{FC}$, a step is taken to a 29th step S29, while if Ne$\leq N_{FC}$, a step is taken to the 30th step S30.

At the 30th step S30, the aforesaid differential slip rate $\lambda$ is compared with the reference value $f_2$(Wr); and if $\lambda$>$f_2$(Wr), a step is taken to the 29th step S29. On the other hand, if $\lambda\leq f_2$(Wr), a step is taken to a 31st step S31. In the step S31, it is decided whether or not Wf>$F_1$(Wr). If Wf>$F_1$(Wr), a step is taken to a 32nd step S32, whereas if Wf$\leq F_1$(Wr), a step is taken to a 34th step S34. In step S32, it is decided whether or not $\lambda$>$f_1$(Wr). If yes, a step is taken to the 29th step S29, whereas if $\lambda\leq f_1$(Wr), a step is taken to a 33rd step S33. In step S33, it is decided whether or not Wf>$F_2$(Wr). If Wf>$F_2$(Wr), a step is taken to the 29th step S29, whereas if Wf$\leq F_2$(Wr), a step is taken to the 34th step S34. In the 29th and 34th steps S29 and S34, a flag $F_S$ is set at "1" and "0", respectively.

When steps S25 and S26 are yes, this means that the vehicle is travelling at an extremely low speed and is about to slip excessively. In addition, the flag $F_S$ represents the condition when the vehicle is slipping excessively or is about to slip excessively. That is, $F_S=1$ indicates that the vehicle is slipping excessively or is about to slip excessively and hence, the fuel is cut to the engine, as described below.

Figure 4:
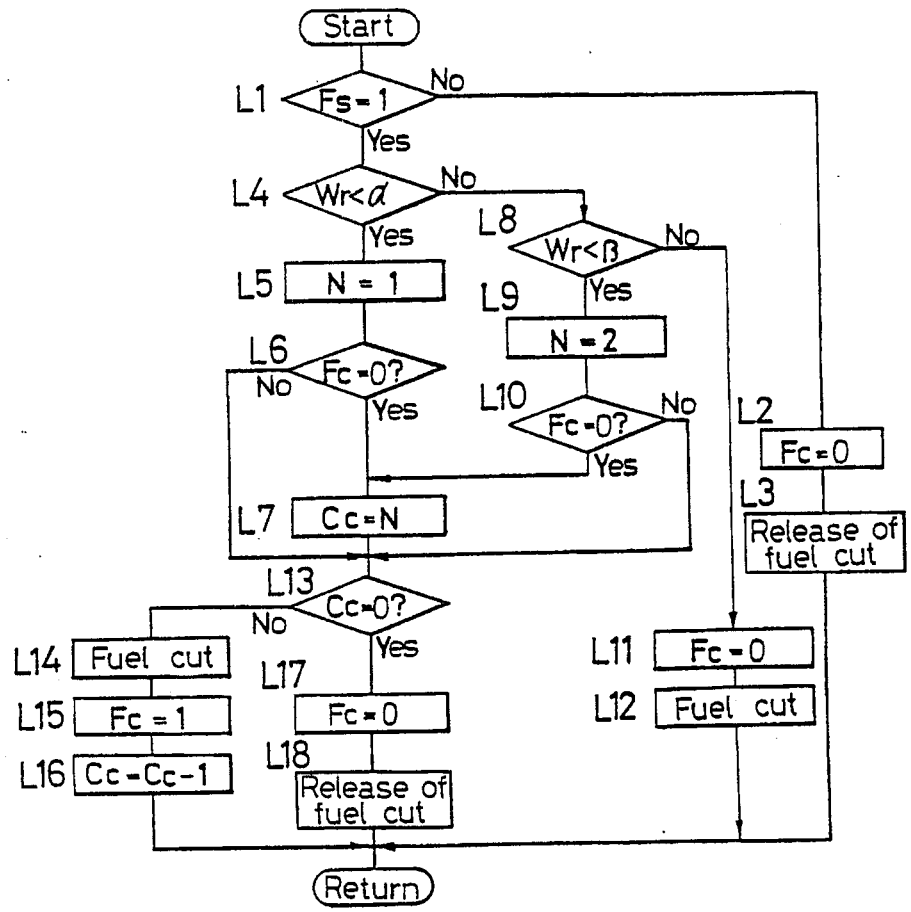

After completion of the procedure for deciding whether or not the vehicle is slipping excessively or is about to slip excessively, i.e., whether or not the flag $F_S$ is at "1", as described above, the controlling of the engine power is carried out according to a procedure illustrated in FIG. 4.

Referring to FIG. 4, it is decided in a first step L1 whether or not the flag $F_S$ is "1", i.e., whether the vehicle is slipping excessively or is about to slip excessively. If $F_S=0$, a step is taken to a second step L2 where a flag $F_C$ is set at "0". This flag $F_C$ represents whether or not the fuel cut step for controlling the number of cylinders has been performed in the immediately proceeding control cycle, and $F_C=1$ indicates that the fuel cut step for controlling of the number of cylinders has been performed. At the next third step L3, the fuel cut command is released, resulting in a normal operation of engine.

When $F_S=1$ in the first step L1, a step is taken to a fourth step L4 where it is decided whether or not the rear wheel speed Wr, representative of the vehicle speed, is lower than $\alpha$, e.g., 12 km/hr. When Wr<$\alpha$, N=1 is established in a fifth step L5 and then, it is judged in a sixth step L6 whether or not $F_C=0$. When $F_C=0$, a count value $C_C$ is set at N in a 7th step L7, proceeding to a 13th step L13. When $F_C=1$, the 7th step L7 is skipped proceeding to the 13th step L13.

When Wr$\geq\beta$ in the fourth step L4, it is decided in an 8th step L8 whether or not Wr$\leq\beta$ (e.g., 20 km/hr). When $\alpha\leq$Wr>$\beta$, N=2 is established in a 9th step L9 and then, it is judged in a 10th step L10 whether or not $F_C=0$. When $F_C=0$, a step is taken to the 7th step L7. When $F_C=1$, a step is taken to the 13th step L13. Alternatively, when $Wr \leq \beta$, a step is taken from the 8th step L8 to the 11th step L11. After $F_C=0$ is set in the 11th step L11, the fuel supply is cut in next 12th step L12.

At the 13th step L13, it is judged whether or not the count value $C_C$ is "0". When $C_C=1$, a fuel cut command is effected in a 14th step L14; $F_C=1$ is established in a 15th step L15 and $C_C=C_C-1$ is established in a 16th step L16. Alternatively, when $C_C=0$ in the 13th step L13, $F_C=0$ is established in a 17th step L17 and then, the fuel cut command is released at an 18th step L18.

The controlling procedure will be summarized as follows: As the vehicle is slipping excessively or is about to slip excessively, fuel cut control for all cylinders is carried out when $Wr \geq \beta$. Alternatively, when $Wr > \alpha$, the supply of fuel is cut for every other cylinder, i.e., fuel cut is effected for three out of six cylinders. Alternatively, when $\alpha \leq Wr > \beta$, adjacent two cylinders are subjected to a fuel cut command, but a cylinder next to the two adjacent cylinders is not subjected to the fuel cut, i.e., four out of six cylinders are subject to the fuel cut.

In this manner, when the vehicle is slipping excessively or is about to slip excessively, the fuel cut control for the number of cylinders corresponding to the vehicle speed is effected, thus resulting in a reduction in driving force, which decreases or avoids excessive slippage. Moreover, under a condition that the vehicle speed is not more than a predetermined level, the fuel cut control for the engine is performed only when the number of revolutions of the engine is judged to be above a set value. Accordingly, it is avoided that the wheel speed of one driving wheel rises extremely high to diminish the accelerating feeling or reduce the driving force or traction available for the vehicle.

Next a second embodiment of the instant invention will be explained with reference to FIGS. 5-7. In the following description, parts of this embodiment corresponding to those of the first embodiments are identified with the same reference numerals and characters.

The road condition detecting device S employed in the preceding first embodiment has been modified in this second embodiment into a bad road detecting device 29 which is particularly operable to decide whether or not the condition of a road surface is bad. Accordingly, in this embodiment, in addition to judging the condition that a vehicle is slipping excessively or is about to slip excessively, it is also judged whether or not the vehicle is travelling on a bad road by means of the bad road detecting device 29. These results of judgment are used to perform the fuel cut control for cylinders of the number selected in accordance with the vehicle speed.

Since the arrangement of portions in this embodiment other than the bad road detecting device 29 is the same as that of the foregoing first embodiment, the following description will be made primarily with respect to that bad road detecting device 29.

Figure 5:
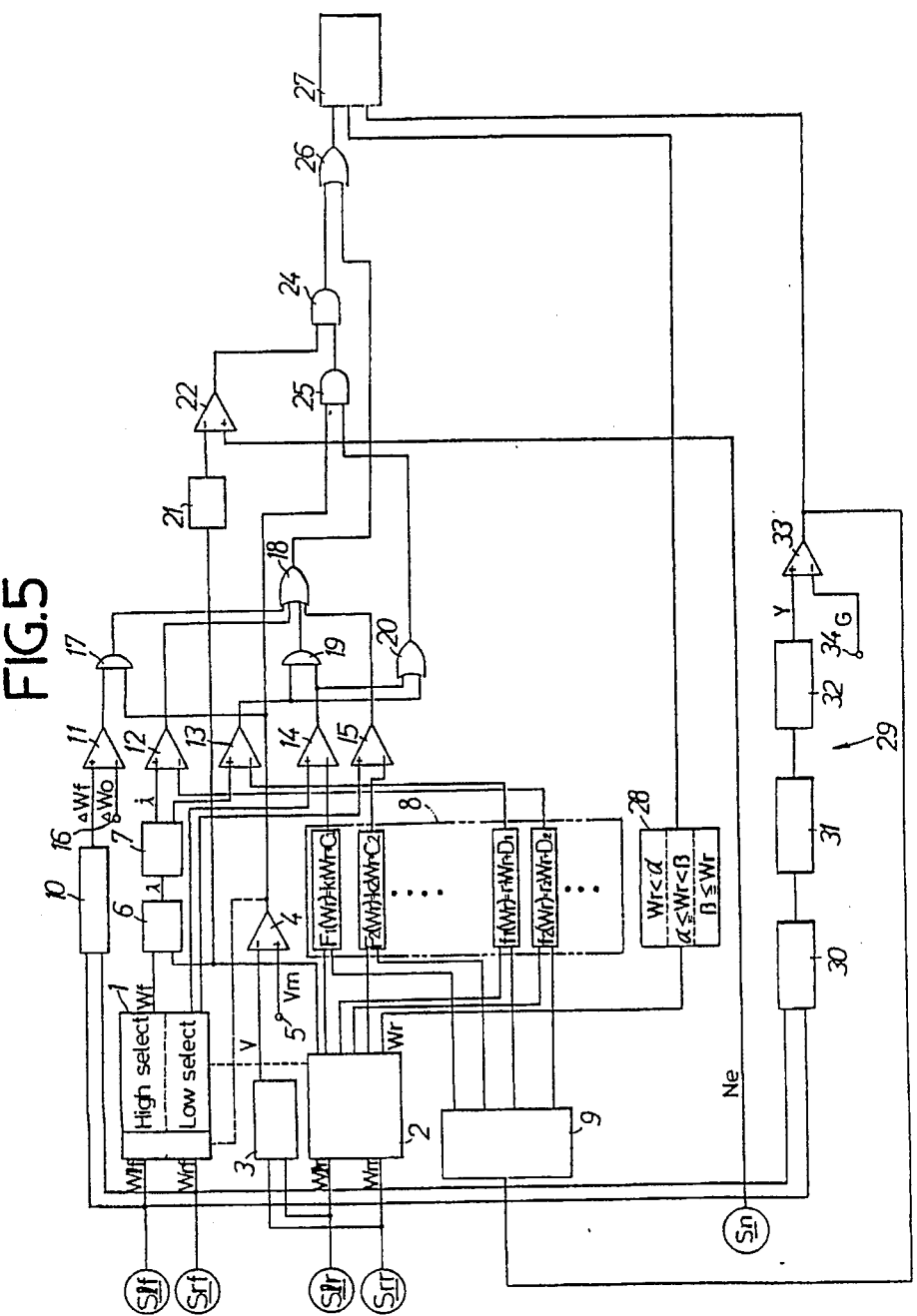
FIG. 5 is a block diagram of a second embodiment of the instant invention, which is employed in a vehicle equipped with a six-cylinder engine.

The bad road detecting device 29 comprises both front wheel speed detectors Slf and Srf, an averaging circuit 32 and a comparator 33, as shown in FIG. 5. The front wheel speed detectors Slf and Srf are connected to the arithmetic circuit 30 and a difference $\Delta Wf$ (Wlf−Wrf) between both front wheel speeds is calculated in the arithmetic circuit 30.

The filter 31 is of a recursive type which passes only those components of varied values of the difference $\Delta Wf$ which are in a given frequency band about predetermined resonance frequencies, e.g., 10 to 15 Hz of a vehicle suspension in a moving direction of the vehicle or in a vertical direction, and in the filter 31, a calculation is made according to the following equation:

$$Y_n = A_1 \cdot Y_{n-1} + A_2 \cdot Y_{n-2} + A_3 \cdot Y_{n-3} \ldots + B_1 \cdot Y_n + \quad (3)$$
$$B_2 \cdot X_{n-1} + B_3 \cdot X_{n-2} \ldots$$

wherein $A_1, A_2, A_3 \ldots B_1, B_2, B_3 \ldots$ are constants the determination of which forms the band-pass filter: $Y_n, Y_{n-1}, \ldots$ are values output from the filter 31; and $X_n, X_{n-1}, \ldots$ are feedback values, with the subscripts n, n−1, n−2, ... representing a present value, the previous value, the next previous value, and so on.

A time-average value of the outputs from the filter 31 is calculated in the averaging circuit 32 (wherein the "time-average value" indicates a value obtained by averaging the outputs within a predetermined time), and an output Y from the averaging circuit 32 is applied to a non-inverted input terminal of the comparator 33. Moreover, a signal corresponding to a reference value G output from a reference terminal 34 is applied to an inverted input terminal of the comparator 33. Thus, when the time-average value Y of the difference values $\Delta Wf$ between the front wheel speeds in the given frequency band has exceeded the reference value G, the comparator 33 supplies a high level signal directly to the engine output controller 27 on the basis of a decision that the vehicle is travelling on a bad road, and also to the reference value change-over means 9.

Accordingly, the engine output controller 27 in this embodiment is arranged to deactivate the combustion strokes of cylinders of the number set in the cylinder-number determination circuit 28 as the combustion stroke deactivating means, concurrently with a change of constants k1, k2, C1 and C2 output from the reference value change-over means 9 in response to detection, by the afore-mentioned bad road detecting device 29, of the situation that the vehicle is travelling on a bad road. That is, when the vehicle is travelling on the bad road, excessive slippage is acceptable to some extent, and supplying of fuel to the cylinders of the number selected according to the rear wheel speed Wr, representative of the vehicle speed, is cut off by means of the engine output controller 27.

When the vehicle is travelling on a bad road, the bad road detecting device 29 enables the condition that the vehicle is travelling on a bad road to be easily and correctly detected on the basis of the fact that the variation in wheel speed is associated with the resonance frequency of the vehicle suspension. Because of the decision from the time-average value, the condition that the vehicle is travelling on a bad road can be detected independent of instantaneous variations.

The operation of this second embodiment will next be described with reference to FIGS. 6 and 7. Since the first step S1 to the 34th step S34 correspond to those of the first embodiment, an explanation will primarily be made as to a 35th step S35 and succeeding steps.

Figure 6:
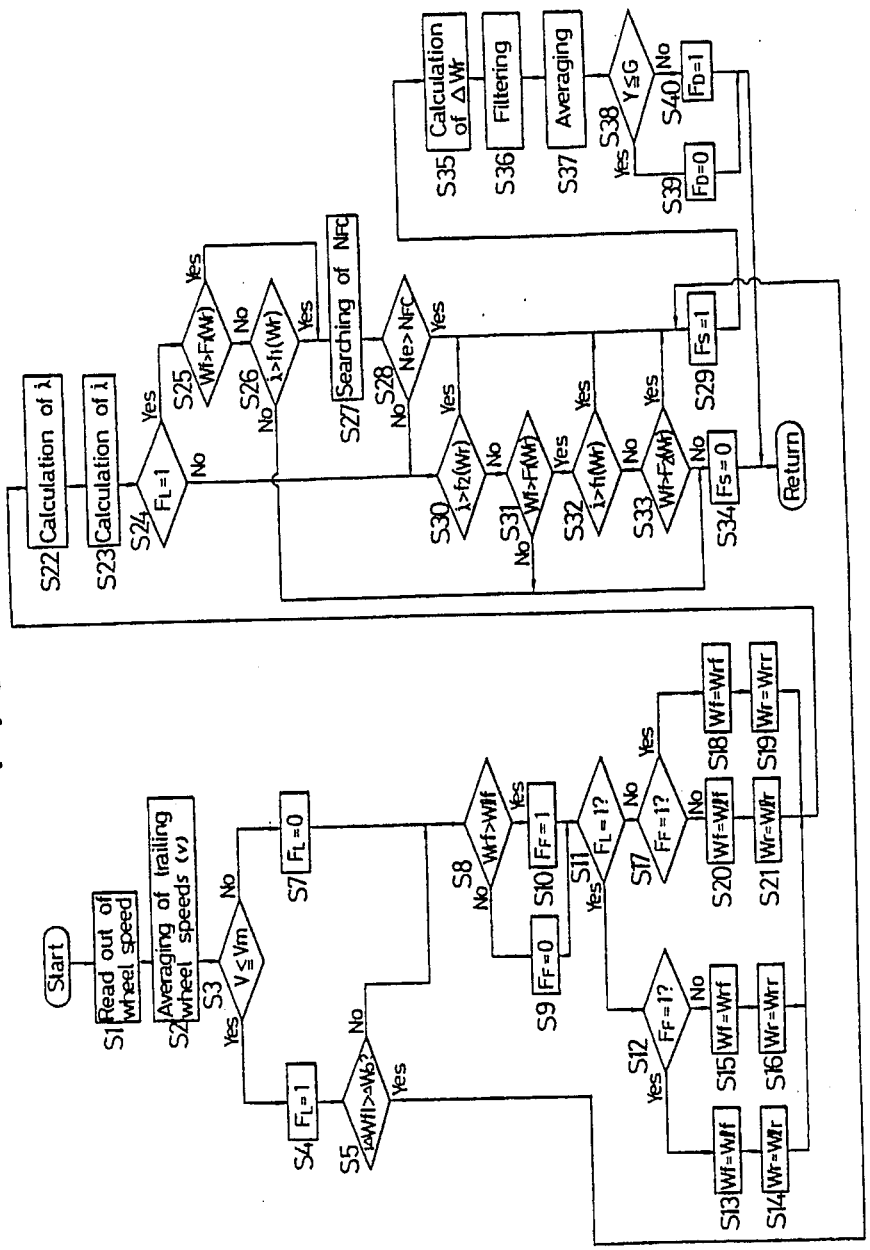
FIGS. 6 and 7 are flow charts each illustrating a controlling procedure according to the second embodiment during the movement of the vehicle.

As shown in FIG. 6, in this embodiment, the similar steps have been taken as the first embodiment until the control procedure arrives at the 29th step S29. When a flag $F_S$ becomes "1" in the 29th step S29, progress is made to the 35th step S35.

The 35th step S35 and succeeding steps indicate a procedure for the detection of a bad road by detecting device 29. At the 35th step S35, the difference ΔWf between the both front wheel speeds Wfl and Wrf is calculated, and at the 36th step S36, the filtering is carried out. The above-described components of the difference ΔWf picked by the filtering are time-averaged at the 37th step S37, and the resulting time-average value Y is judged in the 38th step S38 whether or not it is smaller than the reference value G. When Y≦G in the 38th step S38, i.e., when the vehicle is not travelling on a bad road, a flag $F_D$ is set at "0". On the other hand, when Y>G, i.e., when it is decided that the vehicle is travelling on a bad road, the flag $F_D$ is set at "1".

Figure 7:
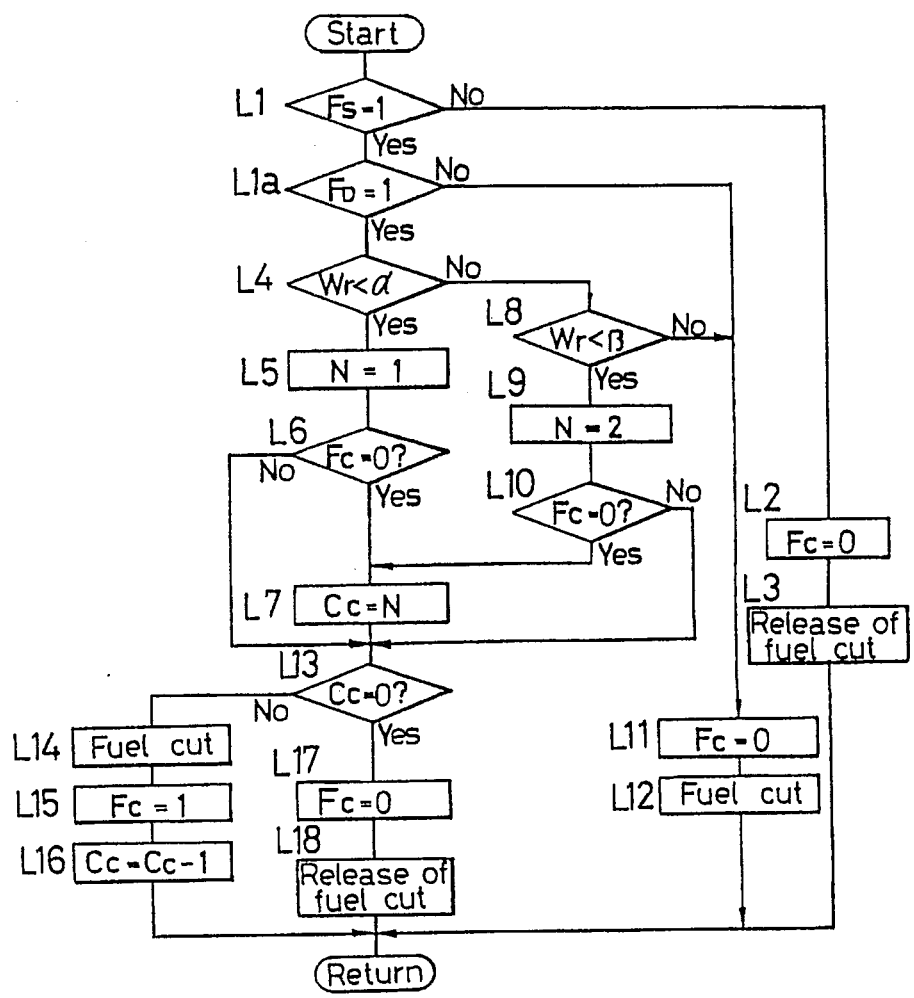

After completion of the procedure for deciding whether or not the vehicle is slipping excessively or is about to slip excessively, i.e., whether or not the flag $F_S$ is at "1" and whether or not the vehicle is travelling on the bad road, i.e., the flag $F_D$ is at "1", as described above, the controlling of the engine power is carried out according to a procedure illustrated in FIG. 7.

The procedure for the controlling of the engine power in this second embodiment differs from that of the first embodiment only in that an additional step L1a is inserted in the second embodiment for judging by the detecting device 29 whether or not the vehicle is travelling on a bad road and this step is carried out after the flag $F_S=1$ is set at the first step L1 and before progressing to the fourth step L4.

When $F_S=1$ in the first step L1, a step is taken to the lath step L1a where it is decided whether or not the vehicle is travelling on a bad road, i.e., whether or not $F_D=1$. When $F_D=0$, after $F_C=0$ is established in the eleventh step L11, the supply of fuel is cut off in the 12th step L12. More specifically, when the vehicle is slipping excessively or is about to slip excessively during travelling on a road which is not a bad road, controlling of the number of cylinders is not conducted, and the combustion stroke of each of the cylinders is inoperative until excessive slipping no longer occurs.

When $F_D=1$ in the step L1a, progress is made to the step L4 and the control procedure after the step L4 is performed in the same manner as the first embodiment (see FIG. 4).

The controlling procedure will be summarized as follows: As the vehicle is slipping excessively or is about to slip excessively, fuel cut control for all cylinders is carried out when the vehicle is travelling on a road which is not bad, or when Wr≧β even if the vehicle is travelling on a bad road. Alternatively, when the vehicle is travelling on a bad road and Wr<α, the supply of fuel is cut for every other cylinder, i.e., fuel cut is effected for three out of six cylinders. Alternatively, when the vehicle is travelling on a bad road and α≦Wr<β, adjacent two cylinders are subjected to a fuel cut command, but a cylinder next to the two adjacent cylinders is not subjected to the fuel cut, i.e., four out of six cylinders are subject to the fuel cut.

In this manner, when the vehicle is slipping excessively or is about to slip excessively, the fuel cut control for the number of cylinders corresponding to the vehicle speed, depending upon whether or not the vehicle is travelling on a bad road, is effected, thus resulting in a reduction in driving force, which decreases or avoids excessive slippage.

Moreover, when the vehicle is travelling at a low speed, the rate of the period making the combustion stroke deactivated occupying in one revolution of the engine is reduced. Therefore, a cycle of making fuel supply and cut of fuel supply is not prolonged at the time of a low speed travel having a long combustion cycle so that deterioration of the drivability is avoided and, by controlling the number of cylinders which are subjected to fuel cut particularly when the vehicle is slipping excessively during travel on a bad road, the deterioration of the drivability can be avoided which would otherwise be liable to be remarkable during travel on a bad road.

Incidentally, in the first embodiment, the road condition detecting device S is connected only to the constant reference value change-over means 9, however, the present invention is not limited to such arrangement and it would be apparent that the device S can be modified so as to apply its output signals directly into the engine output controller 27 like the second embodiment.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:
1. A vehicle traction control device, comprising:
   an excessive slip detecting means for detecting an excessive slip in a driving wheel which is driven by an engine;
   an engine output controller for deactivating a combustion stroke of the engine in response to detection of the excessive slip by said detecting means;
   a vehicle speed index output means for outputting an index representative of a vehicle speed; and
   a combustion stroke deactivating means for reducing a rate of a period of deactivating the combustion stroke of the engine per revolution of the engine, caused by said engine output controller, in accordance with said index.

2. The device of claim 1, further comprising a bad road detecting means, coupled to said engine output controller, for detecting whether a road surface on which a vehicle is travelling is bad, wherein said engine output controller operates to deactivate the combustion stroke of the engine in response to a signal from said combustion stroke deactivating means when the vehicle is slipping excessively and in response to a signal from said bad road detecting means when the road surface is in a bad condition.

3. The device of one of claims 1 or 2, wherein said engine comprises a multi-cylinder engine and said combustion stroke deactivating means comprises a cylinder-number determination circuit which is adapted to reduce the number of cylinders, of which the combustion stroke is deactivated, in response to said index.

* * * * *